(12) United States Patent
Phogat et al.

(10) Patent No.: US 12,148,089 B2
(45) Date of Patent: Nov. 19, 2024

(54) RESOLUTION INDEPENDENT 3-D VECTORIZATION FOR GRAPHIC DESIGNS

(71) Applicant: Adobe Inc., San Jose, CA (US)

(72) Inventors: Ankit Phogat, Uttar Pradesh (IN); Xin Sun, Palo Alto, CA (US); Vineet Batra, Delhi (IN); Sumit Dhingra, New Delhi (IN); Nathan A. Carr, San Jose, CA (US); Milos Hasan, Lafayette, CA (US)

(73) Assignee: Adobe Inc., San Jose, CA (US)

( * ) Notice: Subject to any disclaimer, the term of this patent is extended or adjusted under 35 U.S.C. 154(b) by 8 days.

(21) Appl. No.: 17/889,168

(22) Filed: Aug. 16, 2022

(65) Prior Publication Data
US 2024/0062455 A1  Feb. 22, 2024

(51) Int. Cl.
*G06T 15/10* (2011.01)
*G06T 11/20* (2006.01)
*G06T 17/20* (2006.01)

(52) U.S. Cl.
CPC .............. *G06T 15/10* (2013.01); *G06T 11/20* (2013.01); *G06T 17/205* (2013.01)

(58) Field of Classification Search
CPC ........ G06T 15/10; G06T 11/20; G06T 17/205
USPC ........................................................ 345/419
See application file for complete search history.

(56) References Cited

U.S. PATENT DOCUMENTS

| | | | |
|---|---|---|---|
| 11,132,836 B2* | 9/2021 | Selvarajan | G06T 17/20 |
| 2012/0256915 A1* | 10/2012 | Jenkins | G06T 15/40 |
| | | | 345/419 |
| 2019/0043253 A1* | 2/2019 | Lucas | G06T 15/10 |
| 2023/0033968 A1* | 2/2023 | Na | G06T 7/90 |

OTHER PUBLICATIONS

Sun et al., "Image Vectorization Using Optimized Gradient Meshes", ACM Trans. Graph., 26:11, Jul. 2007, 8 pages.
Xia et al., "Patch-Based Image Vectorization with Automatic Curvilinear Feature Alignment", ACM Transactions on Graphics, vol. 28, No. 5, Article 115, Dec. 2009, 10 pages.

* cited by examiner

*Primary Examiner* — Jin Ge
(74) *Attorney, Agent, or Firm* — Nicholson De Vos Webster & Elliott LLP

(57) ABSTRACT

Embodiments are disclosed for performing 3-D vectorization. The method includes obtaining a three-dimensional rendered image and a camera position. The method further includes obtaining a triangle mesh representing the three-dimensional rendered image. The method further involves creating a reduced triangle mesh by removing one or more triangles from the triangle mesh. The method further involves subdividing each triangle of the reduced triangle mesh into one or more subdivided triangles. The method further involves performing a mapping of each pixel of the three-dimensional rendered image to the reduced triangle mesh. The method further involves assigning a color value to each vertex of the reduced triangle mesh. The method further involves sorting each triangle of the reduced triangle mesh using a depth value of each triangle. The method further involves generating a two-dimensional triangle mesh using the sorted triangles of the reduced triangle mesh.

20 Claims, 11 Drawing Sheets

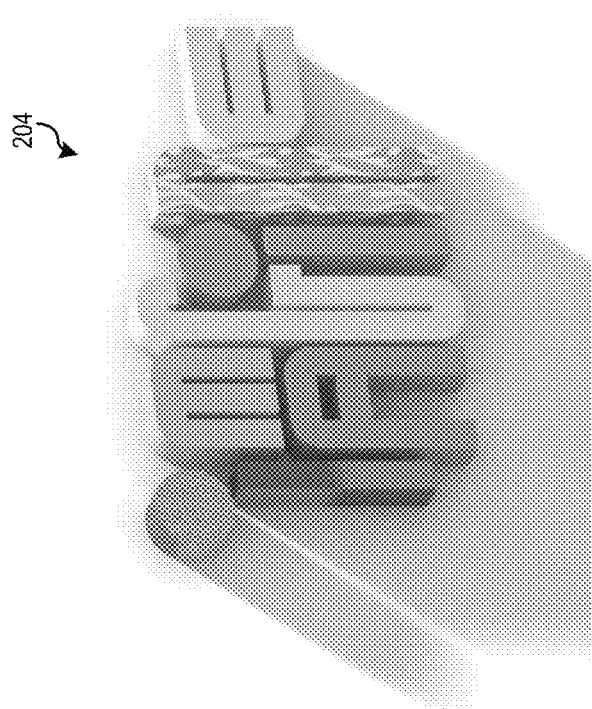
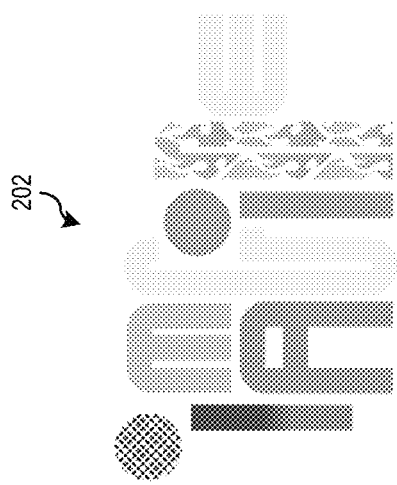
FIG. 2

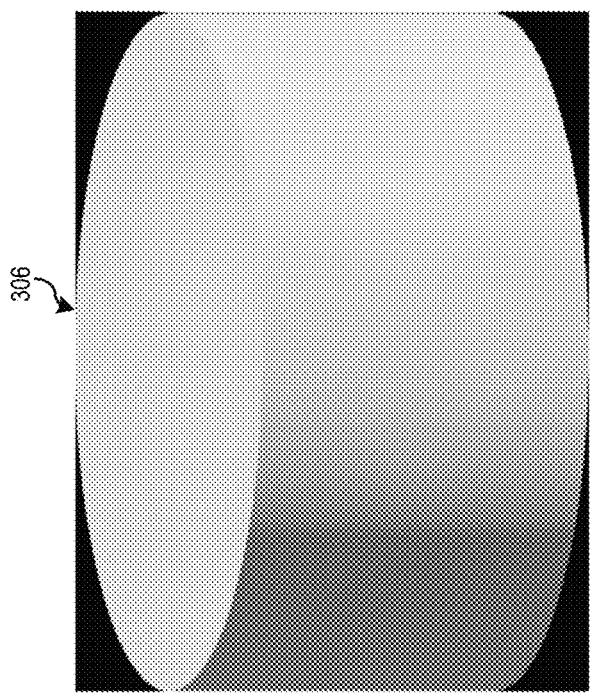
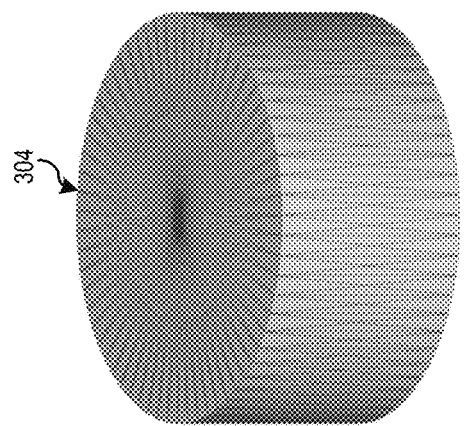
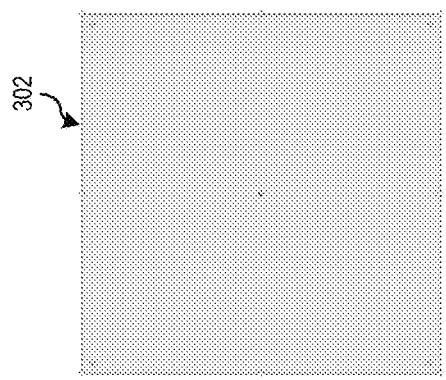
FIG. 3

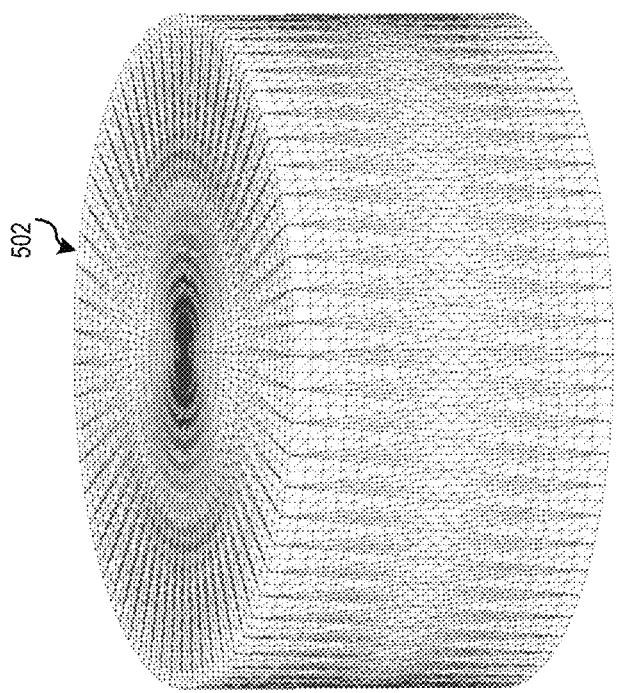
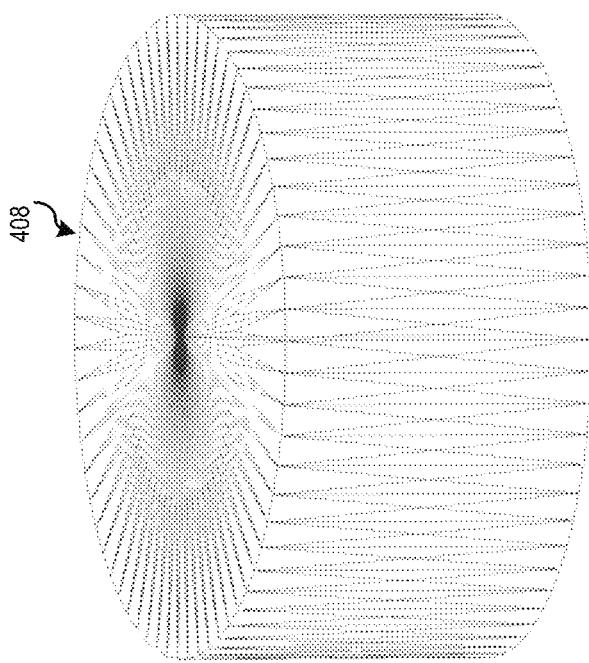
FIG. 5

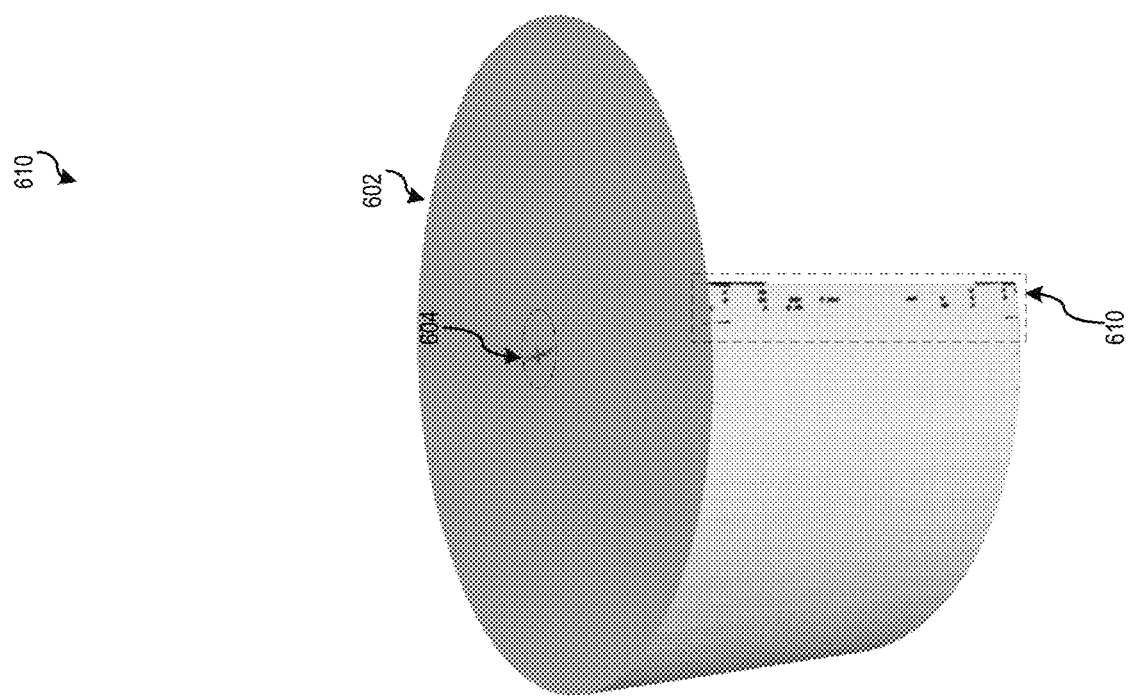
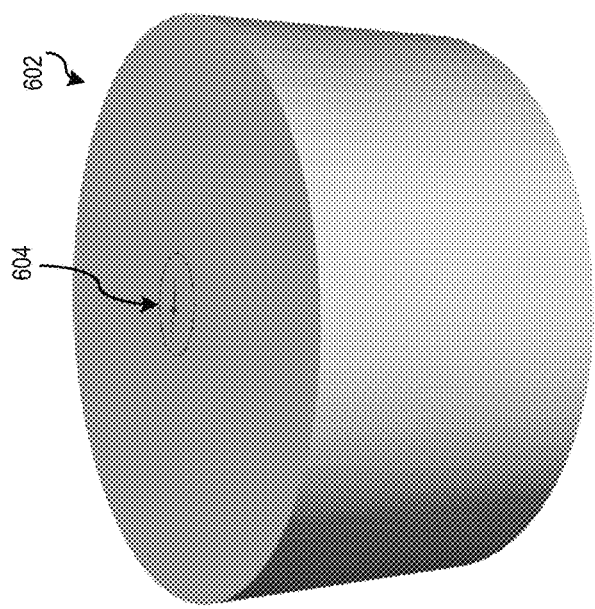
FIG. 6

RESOLUTION INDEPENDENT 3-D VECTORIZATION FOR GRAPHIC DESIGNS

BACKGROUND

In graphic design, vector graphics are some of the most versatile forms of content generation. Vector graphics are used in a wide range of contexts including icons, logos, fonts, maps, and other designs. Typically, vector graphics are created with solid fills and strokes which gives them a distinctly flat shading appearance. With the growth in use of vector graphics, an increasing trend to photo-realistic appearances for graphic designs presents a challenge for resolution independent representations for the graphic designs. Representing three-dimensionally rendered images presents further challenges with distortion or pixelation when different levels of zoom or scaling are applied.

SUMMARY

Introduced here are techniques/technologies that relate to generating two-dimensional (2-D) vector graphics that represent a three dimensional (3-D) rendered image. A 3-D vectorization system performs an inversion of a rendering process. The 2-D vector graphics representation is achieved by performing an inverse projection of colors onto vertices of a 2-D mesh that approximates a 3-D mesh having sharp edges and smooth shading. The inverse projection is performed in primitive space which provides the ability to preserve the fidelity of appearance and downstream compatibility. To perform the inverse projection, a triangle mesh is created, and the triangles are subdivided uniformly along the base edge. The inverse projection provides clear, crisp edges and allows the final image to be scaled without loss of clarity or quality as compared to existing technologies. To improve the processing times and memory capacity, the system accounts for lighting and camera vantage points and removes triangles which are not visible based on the object and camera position. The vertices of the remaining triangles are assigned a color based on the pixel of the 3-D rendered image. After completing the color assignment, the system performs a nearest neighbor color propagation for triangles that are not assigned a color (e.g., very small triangles or near positions where triangles are removed). The triangles are subsequently sorted by depth and the z-values are discarded. The 2-D positions of the triangles and vertices are encoded, and the result is a 2-D image that is scalable without loss of pixel clarity, edge definition, or distortion.

By performing the inverse projection of colors onto vertices of the 2-D mesh, accurate representations of the 3-D edges and shading are preserved in the 2-D representation. Additionally, the final 2-D image is transformed using a scaling, zooming, or other adjustment without having pixelation or distortion.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 2 illustrates a 2-D vector design and a 3-D rendered appearance;

FIG. 3 illustrates an example of a 2-D vector path, a surface of revolution, and a rendered raster image in accordance with one or more embodiments;

FIG. 5 illustrates an example of a process for edge-length subdivision of the triangle mesh in accordance with one or more embodiments;

FIG. 6 illustrates an example of inverse projection of colors onto the vertices of the triangle mesh in accordance with one or more embodiments;

DETAILED DESCRIPTION

Figure 1:
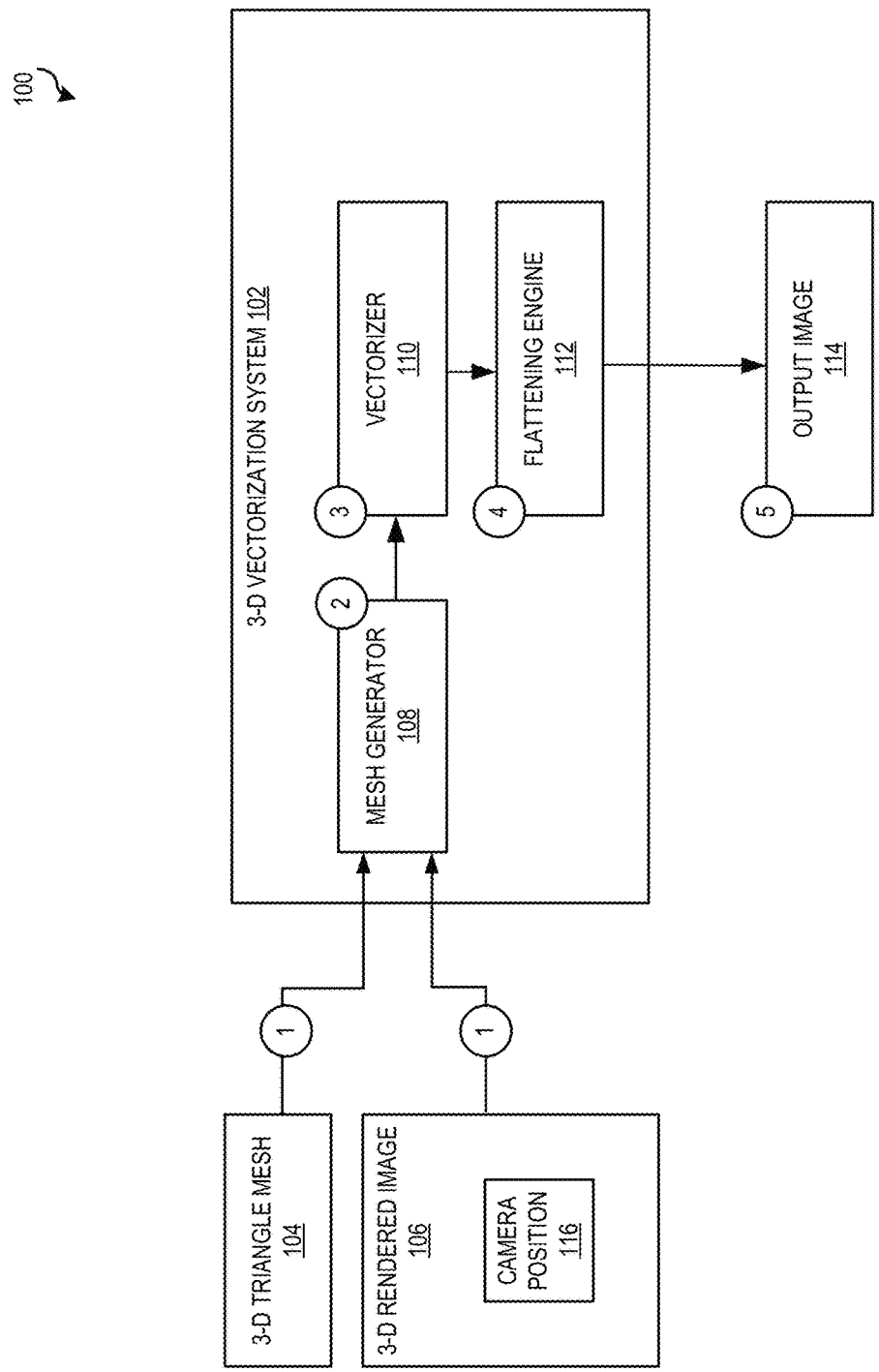
FIG. 1 illustrates a diagram of a process of a 3-D vectorization in accordance with one or more embodiments.

One or more embodiments of the present disclosure includes a 3-D vectorization system that generates a 2-D vector graphic from a rendered 3-D image. Challenges are presented when trying to represent high frequency details or photo-realistic appearances. Further challenges are presented when changing attributes such as scaling or zooming which often results in pixelation or distortion. Some research has been performed on converting a raster image to a gradient mesh (bi-cubic path mesh). The limitation with existing approaches that attempt to produce vectors given a raster image, is that they must accurately infer all of the edges in the image. Furthermore, in many cases they must "invert" the antialiasing process which is an under-constrained problem. As a result, they tend to produce sub-optimal results and suffer from issues such as color bleeding across edges, or loss of important edge features.

As discussed, conventional techniques lack the ability to represent high frequency details or photo-realistic appearances when performing scaling or zooming. As a result, scaling a zooming of conventional systems result in pixelation or distortion. This results in an undesirable output image that does not accurately represent the edges, objects, and depth relationships of the 3-D rendering. Alternatively, reperforming a traditional rendering process is computationally expensive and not suitable for processing images in high volume.

To address these and other deficiencies in conventional systems, embodiments perform an inverse projection of colors of the 3-D rendered image onto vertices of the 2-D mesh, accurate representations of the 3-D edges and shading are preserved in the 2-D representation. Additionally, the final 2-D image is transformed using a scaling, zooming, or other adjustment without having pixelation or distortion.

The 3-D vectorization system obtains a three-dimensional rendered image and a camera position. A triangle mesh is generated to represent the three-dimensional rendered image. Using the camera position, the 3-D vectorization system creates a reduced triangle mesh by removing some triangles from the triangle mesh depending on the camera position. The reduced triangle mesh is subdivided so that each triangle of the reduced triangle mesh is split into one or more subdivided triangles. After subdivision, the 3-D vectorization system performs a mapping of each pixel of the three-dimensional rendered image to the reduced triangle mesh. A color value is assigned to each vertex of the reduced triangle mesh. The reduced triangle mesh is sorted using a depth value of each triangle and a two-dimensional triangle mesh is generated using the sorted triangles of the reduced triangle mesh.

Embodiments provide a capability to manipulate the output 2-D image without pixelation or distortion. By using the inverse projection of colors onto vertices of the 2-D mesh, the 3-D vectorization system is able to retain edge definition and high frequency object information. While some of the description of the figures refers to triangles, embodiments can include using other primitives, e.g., polygons of other shapes and polygonal meshes accordingly.

FIG. 1 illustrates a diagram of a process of 3-D vectorization in accordance with one or more embodiments. As depicted in FIG. 1, a 3-D vectorization system 102 includes a mesh generator 108, a vectorizer 110, and a flattening engine 112.

At numeral 1, the 3-D vectorization system 102 obtains a 3-D rendered image 106 and a 3-D triangle mesh 104. For instance, the 3-D triangle mesh represents the geometry of the 3-D rendered image. The 3-D rendered image is a raster image that represents a 3-D image including a camera angle from which the 3-D rendered image is being viewed. Turning briefly to FIG. 2, a 2-D vector art 202 has been processed through a 3-D rendering pipeline to generate 3-D rendered image 204. As illustrated by FIG. 2, the 3-D rendered image 204 has a camera angle, shadows created from lighting effects, and a depth to the objects. The 3-D rendered image 204 including the camera angle (e.g., as metadata or in the object model) is obtained by the 3-D vectorization system 102. The 3-D rendered image 204 is produced by a traditional rendering pipeline and rasterization process.

Returning to FIG. 1 at numeral 1, the 3-D triangle mesh 104, the 3-D rendered image 106, including the camera position 116, is obtained from a user interface or is retrieved from a memory device.

At numeral 2, the mesh generator 108 identifies a set of triangles of the 3-D triangle mesh that are disposed in a position that is not visible from the camera position. The mesh generator 108 uses the camera position 116 of the 3-D rendered image 106 to determine the set of triangles of the 3-D triangle mesh 104 that are not visible. For example, the set of triangles includes triangles that are rear-facing or on the bottom of an object. The mesh generator 108 generates a reduced triangle mesh that has a significant reduction in primitives from the 3-D triangle mesh. Because the set of triangles that are removed are not visible to the camera position, the appearance is unchanged, but the reduction in primitives improves processing time. Additional details relating to removing triangles are likely best understood with additional reference to FIGS. 3-4.

The mesh generator 108 outputs the reduced triangle mesh to the vectorizer 110. At numeral 3, the vectorizer 110 performs a subdivision of each triangle of the reduced triangle mesh into one or more additional triangles. In some embodiments, the number of subdivisions performed on each edge of each triangle is proportional to the edge length.

In the reduced triangle mesh, the size of triangles in the input 3D mesh may not be uniform. The vectorizer applies subdivision proportional to the edge length so that the resulting subdivided triangle mesh has triangles with greater uniformity. The vectorizer 110 also analyzes the triangle shape before performing subdivision. In some triangles that have a shape that has a short base and long edges (e.g., "narrow"), the vectorizer 110 splits the triangle sides to generate triangles that have more equal length edges. By applying this analysis, the vectorizer 110 generates the subdivided triangle mesh with greater uniformity of triangle shapes across the mesh. The vectorizer 110 also determines that a subset of edges for one or more triangles of the reduced triangle mesh are below a threshold length for subdivision. The threshold length is a pre-determined value or adaptive dependent on the size of the reduced triangle mesh. For edges below the threshold length, the vectorizer 110 can skip performing a subdivision. In some examples, the threshold length is set to a value that ensures all of the triangles of the subdivided triangle mesh remain connected. The vectorizer 110 enforces the connection of the subdivided triangle mesh by forming a number of smaller triangles including a sub-edge (i.e., a subdivision of a larger edge) and a connecting edge with the connecting edge being a second sub-edge of an adjacent smaller triangle. The use of adjacent sub-edges during subdivision ensures that the vectorizer 110 is only inserting additional vertices of subdivision where the additional vertices will share at least one edge with the adjacent smaller triangle of the subdivided triangle mesh.

After subdivision of the reduced triangle mesh, the vectorizer 110 also performs a mapping of each pixel of the three-dimensional rendered image to the reduced triangle mesh. The vectorizer 110 performs the mapping by inverse projection of the colors of each pixel of the 3-D triangle mesh 104 to a corresponding pixel of the subdivided triangle mesh. The vectorizer 110 rasterizes the 3-D triangle mesh 104 into a buffer that includes color information and depth information (e.g., an RGB+Depth buffer). By using a depth test, the vectorizer 110 maps each pixel and a corresponding triangle in the subdivided triangle mesh. For each pixel of the 3-D triangle mesh 104, the vectorizer 110 computes a barycentric weight for each pixel using the vertices of a particular triangle that includes the pixel. The barycentric weight for each of the vertices is stored in the color information (e.g., RGB channel information).

The vectorizer 110 assigns a color to each vertex of the reduced triangle mesh using the barycentric weight for each vertex. In some examples, a group of vertices may not be mapped to a pixel and thus not having a color assigned. For instance, some triangles contain fractions of a pixel or be partially occluded. Examples include very small triangles around the edges where the triangle are only partially visible or at high frequency triangle locations such as the center of a circle. The vectorizer 110 applies a color propagation to any vertices that do not have a color mapping using a nearest neighbor (e.g., the nearest neighbor triangle) color propagation. The color propagation by the vectorizer 110 is iteratively repeated until all vertices are mapped to a color assignment.

At numeral 4, the flattening engine 112 generates a 2-D triangle mesh that is output. The flattening engine 112 receives the reduced triangle mesh with the color assignments for each vertex, such as with an RGB+Depth buffer. Unlike a traditional rendering engine that operates at the fragment level, the flattening engine 112 performs the flattening in primitive space to preserve the fidelity of appearance. The flattening engine 112 sorts the reduced triangle mesh using the depth information. The sorting is performed by comparing the depth information for each triangle at centroids of the triangles. A centroid of a triangle is defined as a point of intersection between line segments that connect a vertex of interior angles of a triangle to a midpoint of the opposing side. The flattening engine 112 compares the centroid position and the depth information to determine a drawing order of triangles. For instance, two triangles have centroids that are within a threshold proximity that indicates overlap between triangle positions when viewed from the camera position. The flattening engine 112 removes the overlap by discarding the triangle information with depth information that indicates a triangle is "below" another triangle at the centroid position. By applying the depth comparison, the flattening engine 112 only draws the triangles which are visible.

At numeral 5, the 3-D vectorization system 102 outputs an output image 114. The 3-D vectorization system 102 can communicate the output image 114 to a screen or another presentation device such as by a user interface.

FIG. 2 illustrates a 2-D vector design and a 3-D rendered appearance. As briefly described above, the 2-D vector art 202 has been processed through a 3-D rendering pipeline to generate a 3-D rendered image 204. In order to generate the 3-D rendered image 204, the 2-D vector art 202 is processed through a 3-D rendering pipeline which incorporates a texture, a camera position, and lighting information into the 3-D rendered image 204. The 3-D rendering pipeline can receive a set of rendering settings from a user such as colors, gradients, substance materials, and a 3D effect such as bevel, inflate, or extrude. The 3-D rendering pipeline generates a 3-D triangle mesh and rasterizes the 3-D triangle mesh to produce the 3-D rendered image 204.

FIG. 3 illustrates an example of a 2-D vector path, a surface of revolution, and a rendered raster image in accordance with one or more embodiments. As described above with regard to generating the 3-D rendered image, a 2-D vector path 302 is processed in a 3-D rendering pipeline. The 3-D rendering pipeline applies a surface of rotation 304 that represents the geometry of the 3-D shape desired. The 3-D rendering pipeline applies the surface of rotation 304 to the 2-D vector path 302 to generate the 3-D rendered image 306. The surface of rotation 304 is a 3-D triangle mesh as described with regard to FIG. 1. The 3-D rendered image 306 includes shading and a camera position, which in this example is from a front side of the cylinder shape in 3-D rendered image 306. As described with regard to FIG. 1, the 3-D triangle mesh 104 can correspond to the surface of rotation 304 and the 3-D rendered image 106 can correspond to the 3-D rendered image 306 as inputs to the 3-D vectorization system.

Figure 4:
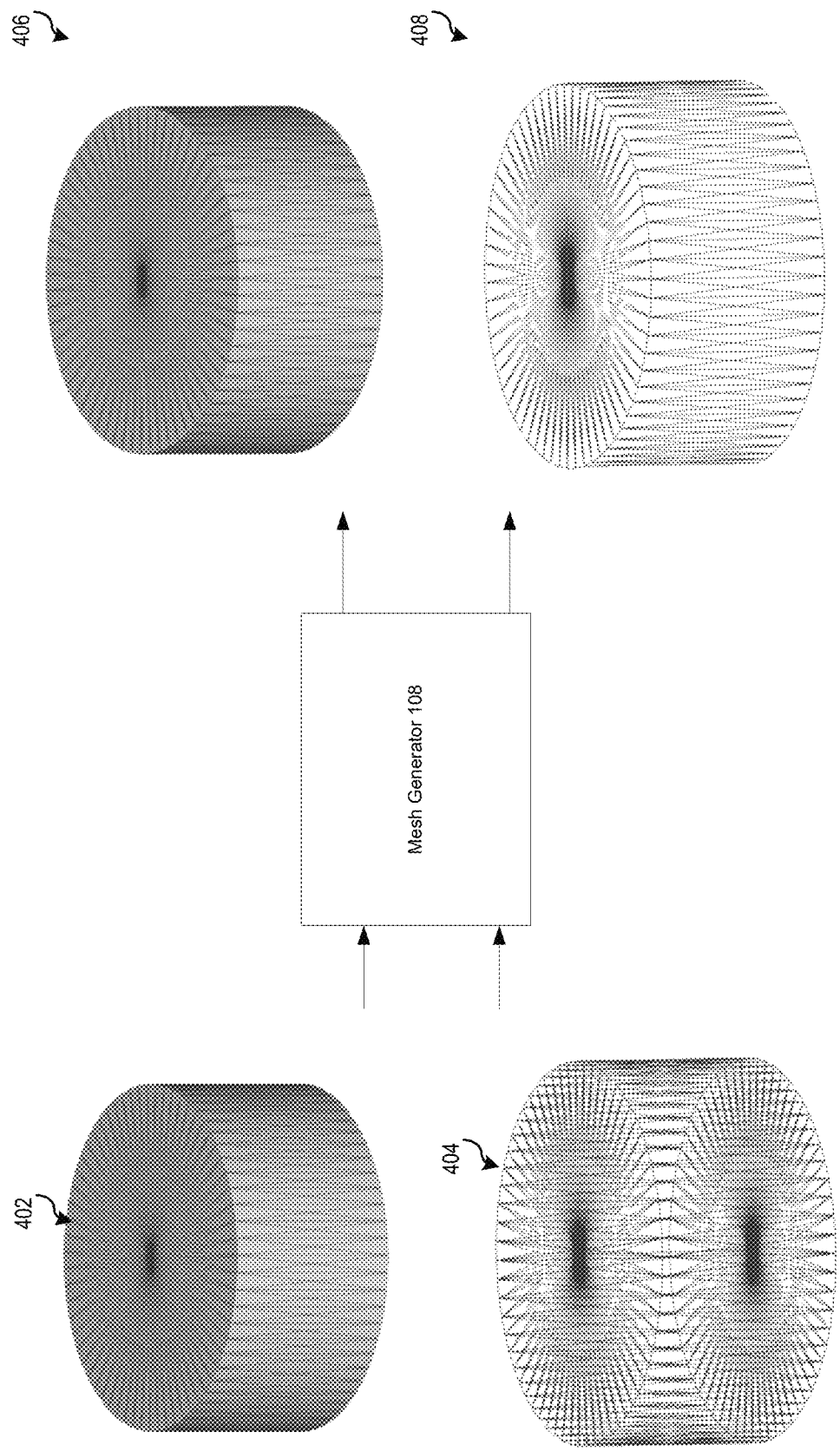
FIG. 4 depicts an example of a process for removing vertices from the triangle mesh in the surface of revolution in accordance with one or more embodiments.

FIG. 4 depicts an example of a process for removing vertices from the triangle mesh in the surface of revolution in accordance with one or more embodiments. As illustrated in FIG. 4, a 3-D triangle mesh 304 is obtained by the 3-D vectorization system. The 3-D triangle mesh 304 is represented by a wireframe 404 that depicts vertices and faces of the 3-D triangle mesh 304. As described above in FIG. 1, the mesh generator can receive the 3-D triangle mesh 304 as described above with regard to FIG. 3, and generate a reduced triangle mesh, such as reduced triangle mesh 406. To generate the reduced triangle mesh, the mesh generator 108 uses the camera position (which in this example is represented by the 3-D triangle mesh 304 view depicted in FIG. 4) to identify any triangles of the 3-D triangle mesh 304 that are obscured or not visible from a position of the camera. In the example depicted by FIG. 4, the triangles to be removed are the back face of the 3-D triangle mesh 304 and the bottom face of 3-D triangle mesh 304. The mesh generator 108 removes these triangles by deleting one or more vertices of these triangles from the 3-D triangle mesh 304. The result of the removal of triangles is a reduced triangle mesh 406 that has a lower number of triangles and a reduced rendering load because the lower number of triangles in the reduced triangle mesh 406 improves processing time. While the reduced triangle mesh 406 and the 3-D triangle mesh 304 appear similar, a reduced wireframe 408 is depicted that illustrates the vertices and faces of the reduced triangle mesh 406.

As further illustrated in FIG. 4, a wireframe 404 representing the 3-D triangle mesh 304 and a reduced wireframe 408 representing the reduced triangle mesh 406 provide a wireframe view of the triangle reduction by the mesh generator 108. The reduced wireframe 408 has significantly fewer vertices and faces as a result of the removed triangles when compared to the wireframe 404.

FIG. 5 illustrates an example of a process for edge-length subdivision of the triangle mesh in accordance with one or more embodiments. The vectorizer 110 processes the reduced wireframe 408 to subdivide the triangles of the reduced triangle mesh 406 (represented by the vertices and faces of reduced wireframe 408). The vectorizer applies edge-length subdivision to generate subdivided triangle mesh 502. The subdivided triangle mesh 502 includes only additional triangles for the triangles of reduced triangle mesh 406 to ensure that any two adjacent triangles will share a connecting edge to prevent gaps. As illustrated by subdivided triangle mesh 502, the vectorizer forms a number of smaller triangles with each smaller triangle connected by the connecting edge that is shared by at least one adjacent triangle. The edge sharing provides a continuous mesh that remains connected with no gaps or discontinuities. By using edge-length subdivision, each triangle has the edges divided uniformly such that triangle of the reduced wireframe 408 is approximately regularly tessellated (e.g., forms a regular pattern with no gaps).

FIG. 6 illustrates an example of inverse projection of colors onto the vertices of the triangle mesh in accordance with one or more embodiments. Specifically, FIG. 6 illustrates color propagation to the subdivided triangle mesh. The vectorizer propagates the color of the 3-D rendered image to the subdivided triangle mesh and generates colorized triangle mesh 602. As described above, a set of triangles 604 do not have a color assigned. In this example, the set of triangles 604 is located at a position with a high density of very small triangles that converge at the center of the circle that is the top of the cylinder. The vectorizer assigns the set of triangles 604 a color using a nearest neighbor approach or can interpolate between neighboring triangles.

Additionally, FIG. 6 illustrates the colorized triangle mesh 602 at a different camera position. In this example, the camera position for colorized triangle mesh 602 has been displaced to a position that rotates the colorized triangle mesh 602 by 90 degrees clockwise. The set of triangles 604 are shown, and an additional set of triangles 610 that are partially occluded when the camera position is at the original position. The vectorizer assigns colors to the additional set of triangles 610 using the nearest neighbor or by interpolating between neighboring triangles. As illustrated by FIG. 6, the camera position shows the area of the 3-D triangle mesh (e.g., 3-D triangle mesh 304) that have been removed and are not included in the colorized triangle mesh 602. The reduction in triangles as described above has a corresponding reduction in the processing overhead to render the colorized triangle mesh 602.

Figure 7:
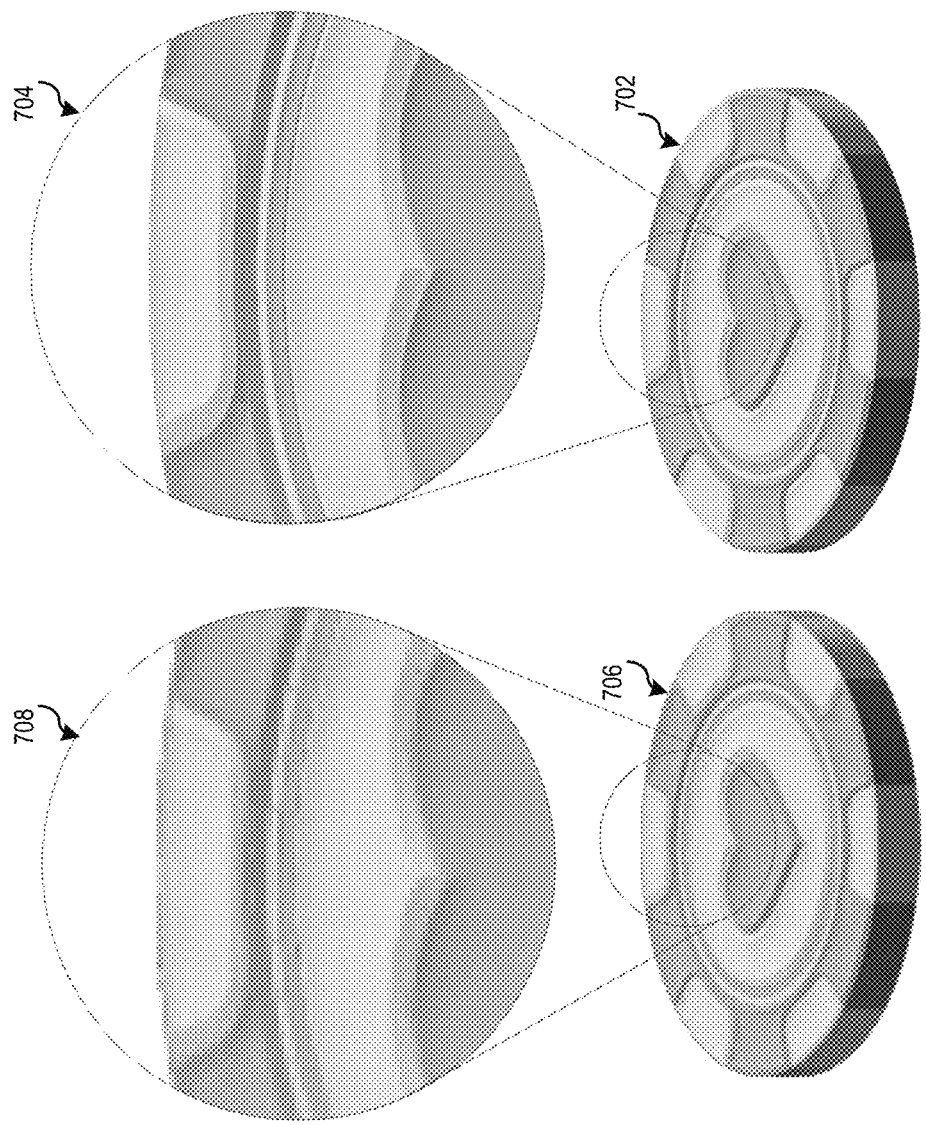
FIG. 7 illustrates examples of results generated by the process of a 3-D vectorization with one or more embodiments.

FIG. 7 illustrates examples of a comparison of results generated by the process of 3-D vectorization with one or more embodiments with a traditional vectorization approach. The output image 702 is generated by the 3-D vectorization system in accordance with one or more embodiments. Implementing embodiments of the 3-D vectorization system as described above by using a three-dimensional rendered image and a camera position to generate a triangle mesh. The 3-D vectorization system creates a reduced triangle mesh and performs a mapping of each pixel of the three-dimensional rendered image to the reduced triangle mesh. As a result, as illustrated by FIG. 7 in expanded region 704, the sharp edges, clear bevel shapes, and accurate depiction of high frequency color changes are without distortion or pixelation. The vector image 706, in contrast, is produced using conventional techniques. As clearly illustrated in expanded region 708, there is pixelation of edges, inaccurate coloration, lost shaping, and the bevel shape is blurry and not crisp. The 3-D vectorization system uses an inverse projection of colors which provides the ability to improve the output image significantly and is demonstrated by comparison of the expanded region 704 and expanded region 708.

Figure 8:
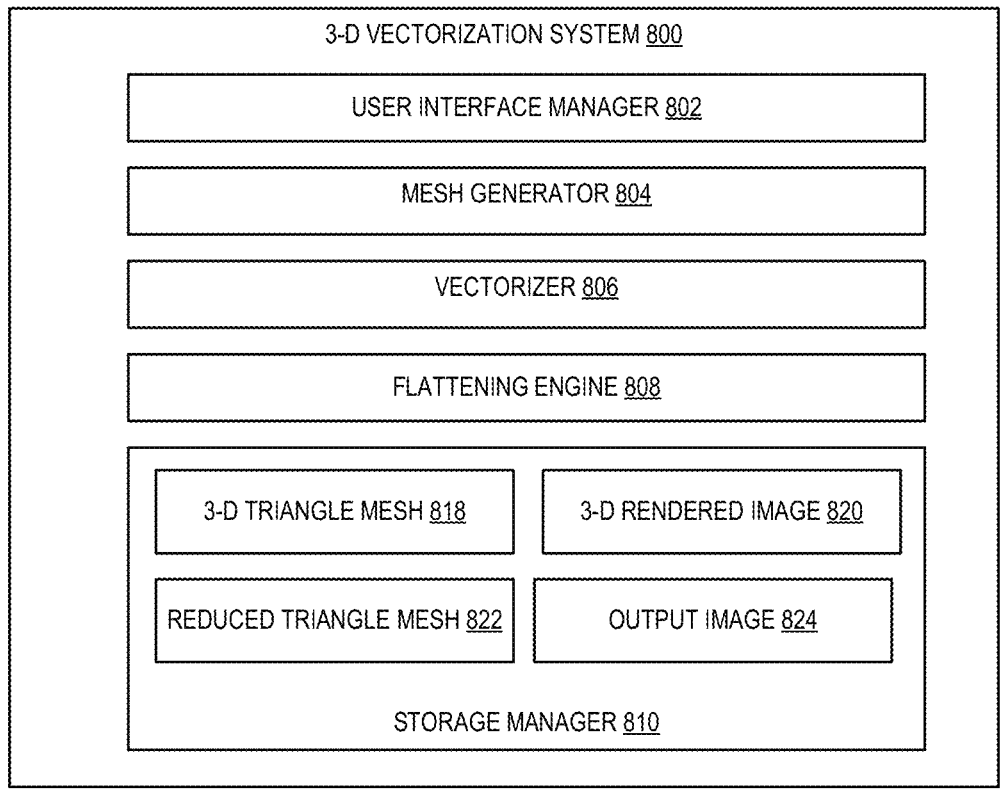
FIG. 8 illustrates a schematic diagram of a 3-D Vectorization system in accordance with one or more embodiments.

FIG. 8 illustrates a schematic diagram of a 3-D vectorization system in accordance with one or more embodiments. As shown, 3-D vectorization system 800 includes, but is not limited to, a user interface manager 802, a mesh generator 804, a vectorizer 806, a flattening engine 808, and a storage manager 810. The storage manager 810 that includes 3-D triangle mesh 818, 3-D rendered images 820, reduced triangle mesh 822, and output image 824.

As illustrated in FIG. 8, the 3-D vectorization system 800 includes a user interface manager 802. For example, the user interface manager 802 allows users to 3-D triangle meshes and 3-D rendered images to the 3-D vectorization system 800. In some embodiments, the user interface manager 802 provides a user interface through which the user interacts with the 3-D triangle meshes or 3-D rendered images such as selecting a 2-D vector path, applying a surface of rotation, or a 3-D rendering pipeline. Alternatively, or additionally, the user interface enable the user to select a 3-D rendered image or a 3-D triangle mesh for import, either by providing an address (e.g., a URL or other endpoint) associated with the remote file or connecting to a remote storage (e.g., cloud storage) that includes the 3-D rendered image or 3-D triangle mesh.

As illustrated in FIG. 8, the 3-D vectorization system 800 includes a mesh generator 804. The mesh generator 804 is configured to identify sets of triangles of the 3-D triangle mesh that are not visible from the camera position of the 3-D rendered image. The mesh generator 804 uses the camera position to determine the sets of triangles of the 3-D triangle mesh that are not visible. For example, the set of triangles includes triangles that are rear-facing or on the bottom of an object. The mesh generator 804 apply a culling function to determine the sets of triangles to remove from the 3-D triangle mesh. The culling function is represented by $\vec{e_1} \times \vec{e_2} \cdot \vec{eye} \leq 0$, with $\vec{e_1}$ representing a first edge of a triangle, $\vec{e_2}$ representing a second edge of a triangle, and $\vec{eye}$ representing the position of the camera.

As illustrated in FIG. 8, the 3-D vectorization system 800 includes a vectorizer 806. For example, the vectorizer 806 performs a subdivision of each triangle of the reduced triangle mesh into one or more additional triangles. The vectorizer 806 determines a number of subdivisions that is performed on each edge of each triangle by analyzing the length of each edge. The vectorizer 806 also analyzes the triangle shape before performing subdivision. In some triangles that have a shape that has a short base and long edges (e.g., "narrow"), the vectorizer splits the triangle sides to generate triangles that have more equal length edges. After subdivision of the reduced triangle mesh, the vectorizer 806 maps each pixel of the 3-D rendered image to the reduced triangle mesh. The pixels are mapped by the vectorizer 806 using an inverse projection of the colors for each pixel of the 3-D triangle mesh onto a corresponding triangle of the subdivided triangle mesh. The vectorizer 806 rasterizes the 3-D triangle mesh into an RGB+Depth buffer. Using a depth test for each triangle, assigns a color to each vertex of the reduced triangle mesh. The vectorizer applies a color propagation to any vertices that do not have a color mapping using a nearest neighbor color propagation. The vectorizer can iteratively perform color propagation until all vertices are mapped to a color assignment.

As illustrated in FIG. 8, the 3-D vectorization system 800 includes a flattening engine 808. For example, flattening engine 808 generates a 2-D triangle mesh that represents the 3-D rendered image 820. The flattening engine 808 computes a reduced triangle mesh and performs an inverse projection of pixels to generate color assignments for each vertex of the reduced triangle mesh. The flattening engine 808 performs the flattening in primitive space and sorts the reduced triangle mesh using the depth information generated by the inverse projection. The sorting is performed by comparing depth parameters of the centroids of the triangles. By applying the sorting of triangles, the 3-D vectorization system only draws the triangles which are visible from the camera position.

The storage manager 810, as shown in FIG. 8, includes the 3-D triangle mesh 818. The 3-D triangle mesh 818 represents the geometry of the 3-D rendered image. For example, the 3-D triangle mesh 818 include vertices and surfaces that correspond to the visual appearance of the 3-D rendered image. The 3-D triangle mesh 818 is generated from a 2-D vector path being processed by a 3-D rendering pipeline.

As further illustrated in FIG. 8, the storage manager 810 also includes 3-D rendered image 820. The 3-D rendered image 820 is a raster image that represents a 3-D object including a camera angle from which the 3-D rendered image 820 is being viewed. The 3-D rendered image 820 is created from a 2-D vector art that is processed through a 3-D rendering pipeline to generate 3-D rendered image 820. The 3-D rendered image 820 has a camera angle, shadows created from lighting effects, and a depth to the objects. The 3-D rendered image 820 is produced by a traditional rendering pipeline and rasterization process.

As further illustrated in FIG. 8, the storage manager 810 also includes reduced triangle mesh 822. The mesh generator 804 generates a reduced triangle mesh that has a significant reduction in primitives from the 3-D triangle mesh 818. The mesh generator 804 uses the 3-D rendered image to determine the set of triangles of the 3-D triangle mesh that are not visible and remove them to create the reduced triangle mesh 822.

The storage manager 810 also include an output image 824. The output image 824 represents the output of the 3-D vectorization system 800 that are stored or presented by a display device to the user during operation of the 3-D vectorization system 800.

Each of the components 802-810 of the 3-D vectorization system 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components that may serve a particular embodiment.

The components 802-810 and their corresponding elements can comprise software, hardware, or both. For example, the components 802-810 and their corresponding elements comprise one or more instructions stored on a computer-readable storage medium and executable by processors of one or more computing devices. When executed by the one or more processors, the computer-executable instructions of the 3-D vectorization system 800 cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Furthermore, the components 802-810 of the 3-D vectorization system 800 may, for example, be implemented as one or more stand-alone applications, as one or more modules of an application, as one or more plug-ins, as one or more library functions or functions that may be called by other applications, and/or as a cloud-computing model. Thus, the components 802-810 of 3-D vectorization system 800 may be implemented as a stand-alone application, such as a desktop or mobile application. Furthermore, the components 802-810 of the 3-D vectorization system 800 may be implemented as one or more web-based applications hosted on a remote server. Alternatively, or additionally, the components of the 3-D vectorization system 800 may be implemented in a suit of mobile device applications or "apps."

Figure 9:
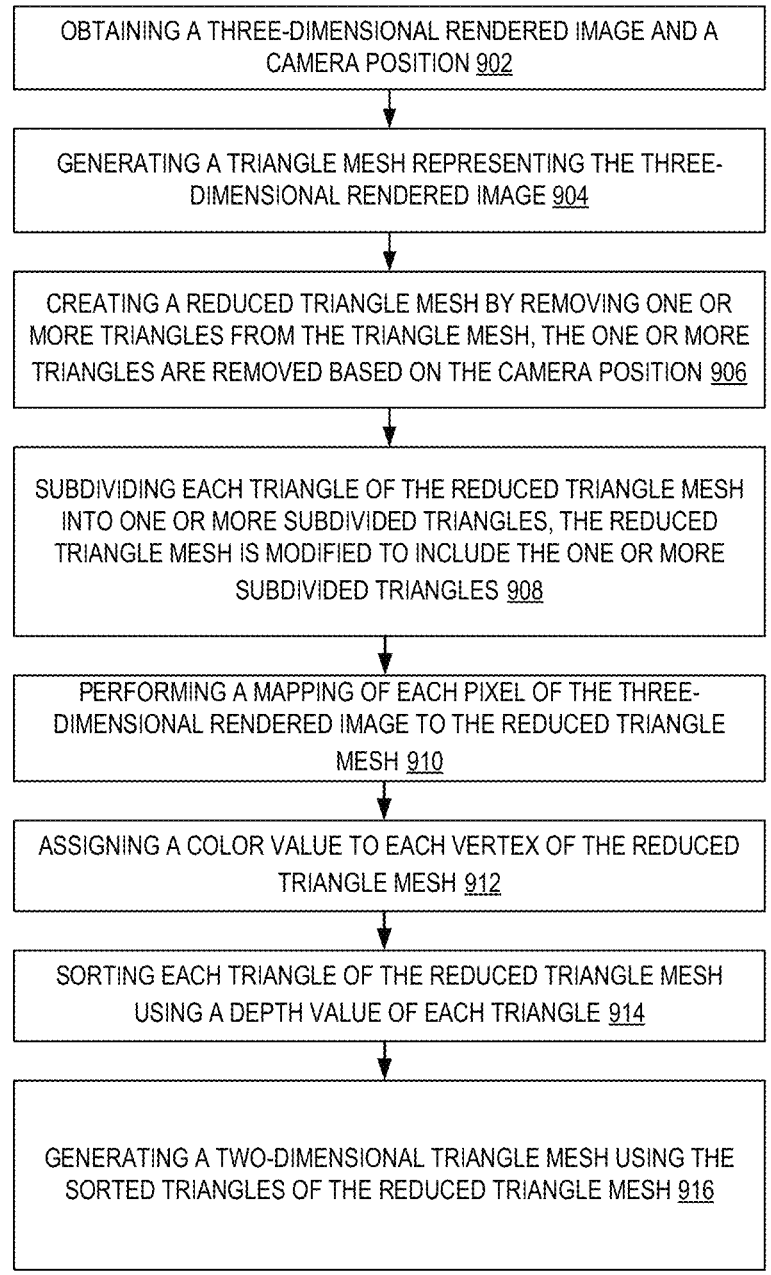
FIG. 9 illustrates a flowchart of a series of acts in a method of a 3-D vectorization in accordance with one or more embodiments.

FIGS. 1-8, the corresponding text, and the examples, provide a number of different systems and devices that perform 3-D vectorization. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of 3-D vectorization in accordance with one or more embodiments. In one or more embodiments, the method 900 is performed in a digital medium environment that includes the 3-D vectorization system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of obtaining a three-dimensional rendered image and a camera position. The 3-D triangle mesh, the 3-D rendered image, including the camera position, can be obtained from a user interface, or can be retrieved from a memory device.

As illustrated in FIG. 9, the method 900 includes an act 904 of obtaining a triangle mesh representing the three-dimensional rendered image. The 3-D vectorization system 800 obtains a triangle mesh such as from a 3-D rendering pipeline that represents the geometry of the 3-D rendered image. The 3-D vectorization system 800 can receive the triangle mesh from the 3-D rendering pipeline that applies a 3D effect such as bevel, inflate, or extrude to a 2-D vector path.

As illustrated by FIG. 9, the method 900 includes an act 906 of creating a reduced triangle mesh by removing one or more triangles from the triangle mesh, the one or more triangles are removed based on the camera position. In some embodiments, the mesh generator identifies a set of triangles of the 3-D triangle mesh that are disposed in a position that is not visible from the camera position. The mesh generator uses the camera position of the 3-D rendered image to determine the set of triangles of the 3-D triangle mesh that are not visible. The mesh generator generates a reduced triangle mesh that has fewer triangles than the 3-D triangle mesh.

As illustrated by FIG. 9, the method 900 includes an act 908 of subdividing each triangle of the reduced triangle mesh into one or more subdivided triangles, the reduced triangle mesh is modified to include the one or more subdivided triangles. For example, the vectorizer subdivides each triangle of the reduced triangle mesh to create one or more additional triangles from each triangle. The vectorizer selects a number of subdivisions for each edge of each triangle using the length of each edge. The vectorizer compares a relationship between the sides of each triangle before performing subdivision to split triangle sides to form smaller triangles that have approximately equal length edges.

As illustrated by FIG. 9, the method 900 includes an act 910 of performing a mapping of each pixel of the three-dimensional rendered image to the reduced triangle mesh. The vectorizer inversely projects a color of each pixel of the 3-D triangle mesh to a triangle of the subdivided triangle mesh. The vectorizer rasterizes uses a depth test of an image buffer which includes color and depth information to map each pixel and a corresponding triangle in the subdivided triangle mesh. For each data location in the buffer, the vectorizer computes a barycentric weight using the vertices of a particular triangle that includes the data location (i.e., a pixel location).

As illustrated by FIG. 9, the method 900 includes an act 912 of assigning a color value to each vertex of the reduced triangle mesh. In some embodiments, the vectorizer assigns a color using the barycentric weight for each vertex of the reduced triangle mesh (including the subdivided triangle vertices). The vectorizer also applies color propagation to any vertex that contain a fraction of a pixel or is partially occluded. The vectorizer identifies very small triangles around the edges where the triangle may only be partially visible or at high frequency triangle location such as the center of a circle for candidates for color propagation. The color propagation is applied using a nearest neighbor color propagation.

As illustrated by FIG. 9, the method 900 includes an act 914 of sorting each triangle of the reduced triangle mesh using a depth value of each triangle. The flattening engine performs a sorting to compare the depth information at centroids of each of the triangles. The flattening engine compares the depth information to determine a drawing order of triangles. The flattening engine detects that two triangles have centroids within a threshold proximity of each other. Two centroids within the threshold proximity indicates overlap between triangle positions when viewed from the camera position. The flattening engine discards the triangle and depth information of the triangle that is "below" the overlapping triangle using the depth information.

As illustrated by FIG. 9, the method 900 includes an act 916 of generating a two-dimensional triangle mesh using the sorted triangles of the reduced triangle mesh. The 3-D vectorization system rasterizes the reduced triangle mesh for an output image. The 3-D vectorization system rasterizes the reduced triangle mesh using the sorting completed during act 914 above. The two-dimensional triangle mesh is output as a rasterized image.

Figure 10:
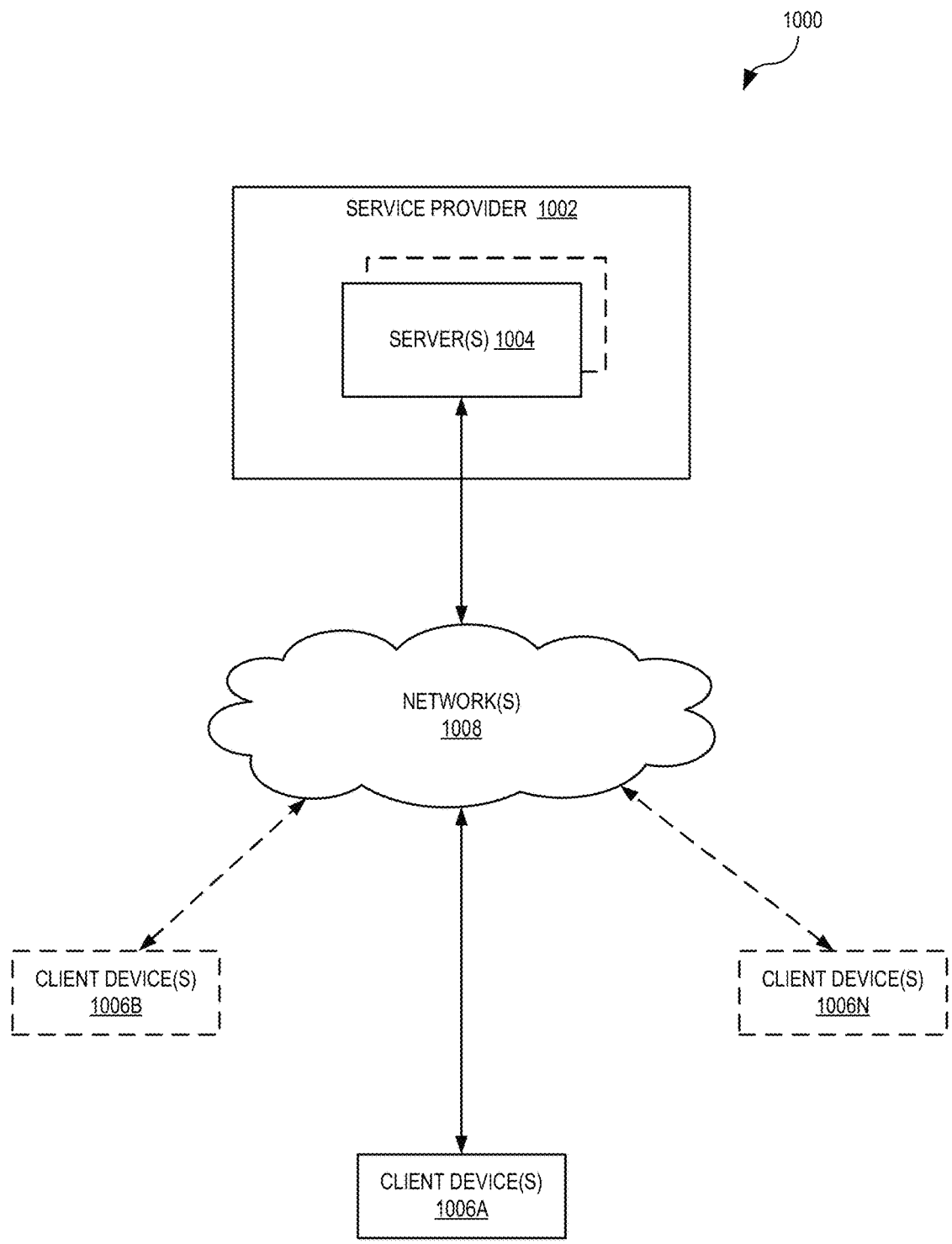
FIG. 10 illustrates a schematic diagram of an exemplary environment in which the 3-D vectorization system can operate in accordance with one or more embodiments.

FIG. 10 illustrates a schematic diagram of an exemplary environment 1000 in which the 3-D vectorization system 800 can operate in accordance with one or more embodiments. In one or more embodiments, the environment 1000 includes a service provider 1002 which includes one or more servers 1004 connected to a plurality of client devices 1006A-1006N via one or more networks 1008. The client devices 1006A-1006N, the one or more networks 1008, the service provider 1002, and the one or more servers 1004 communicates with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 is implemented on a single computing device with the 3-D vectorization system 800. In particular, the 3-D vectorization system 800 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or fewer than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including 3-D triangle mesh 818, 3-D rendered image 820, reduced triangle mesh 822, output image 824, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the 3-D vectorization system 800. In particular, the 3-D vectorization system 800 can comprise an application running on the one or more servers 1004 or a portion of the 3-D vectorization system 800 is downloaded from the one or more servers 1004. For example, the 3-D vectorization system 800 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more 3-D triangle mesh 818 or 3-D rendered images 820 stored at the one or more servers 1004. Moreover, the client device 1006A can receive a request (i.e., via user input) to generate an output image 824 and provide the request to the one or more servers 1004. Upon receiving the request, the one or more servers 1004 can automatically perform the methods and processes described above to generate output audio representative of the drawing tool, canvas material, and real-time raw drawing parameters. The one or more servers 1004 can provide all or output image 824, to the client device 1006A for presentation to the user.

As just described, the 3-D vectorization system 800 may be implemented in whole, or in part, by the individual elements 1002-1008 of the environment 1000. It will be appreciated that although certain components of the 3-D Vectorization system 800 are described in the previous examples with regard to particular elements of the environment 1000, various alternative implementations are possible. For instance, in one or more embodiments, the 3-D Vectorization system 800 is implemented on any of the client devices 1006A-N. Similarly, in one or more embodiments, the 3-D Vectorization system 800 may be implemented on the one or more servers 1004. Moreover, different components and functions of the 3-D vectorization system 800 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media is any available media that is accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which is used to carry desired program code means in the form of computer-executable instructions or data structures and which is accessed by a general purpose or special purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) is included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model is composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
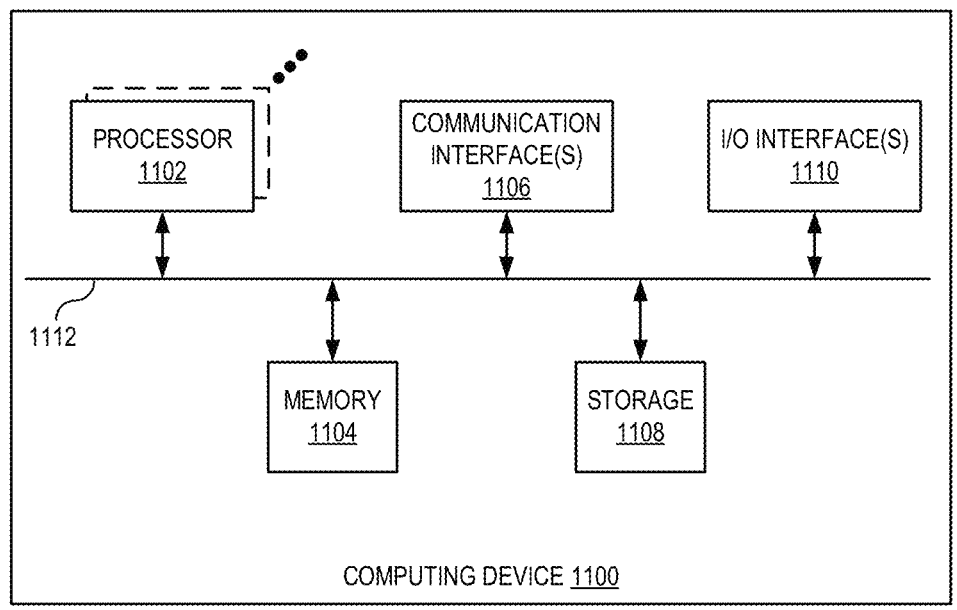
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the 3-D vectorization system. As shown by FIG. 11, the computing device 1100 can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 that includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination of these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to display for presentation to a user. The graphical data is representative of one or more graphical user interfaces and/or any other graphical content that serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
 obtaining a three-dimensional rendered image and a camera position;
 generating a polygonal mesh representing the three-dimensional rendered image;
 creating a reduced polygonal mesh by removing one or more polygons from the polygonal mesh, wherein the one or more polygons are removed based on the camera position;
 subdividing each polygon of the reduced polygonal mesh into one or more subdivided polygons wherein the one or more subdivided polygons include a number of smaller polygons formed by a number of sub-edges and connecting edges divided from each polygon of the reduced polygonal mesh, wherein the number of sub-edges divided from an edge of a polygon is defined by a proportion to a length of the edge;
performing a mapping of each pixel of the three-dimensional rendered image to the reduced polygonal mesh; and
generating a two-dimensional polygonal mesh.

2. The method of claim 1, wherein creating a reduced polygonal mesh by removing one or more polygons from the polygonal mesh, wherein the one or more polygons are removed based on the camera position comprises:
determining that the one or more polygons are not visible to the camera using the camera position and a visible frame of the three-dimensional rendered image; and
removing the one or more polygons from the polygonal mesh.

3. The method of claim 1, wherein the connecting edge is a second sub-edge of an adjacent smaller polygon.

4. The method of claim 1, wherein obtaining a three-dimensional rendered image comprises performing a three-dimensional rendering on a two-dimensional vector graphic.

5. The method of claim 1 further comprising flattening the two-dimensional polygonal mesh by removing a depth value from the two-dimensional polygonal mesh, wherein the flattening is performed in a primitive space.

6. The method of claim 1, wherein generating a two-dimensional polygonal mesh comprises:
assigning a color value to each vertex of the reduced polygonal mesh; and
sorting each polygon of the reduced polygonal mesh using a depth value of each polygon.

7. The method of claim 6 wherein assigning a color value to each vertex of the polygonal mesh comprises:
performing an inverse projection of the color value of a pixel of the three-dimensional rendered image to each vertex of the reduced polygonal mesh;
detecting a polygon of the reduced polygonal mesh that does not have an assigned color value;
identifying a nearest neighbor polygon to the polygon; and
assigning the color value of the nearest neighbor polygon to the polygon.

8. The method of claim 7, wherein performing an inverse projection of the color value of a pixel of the three-dimensional rendered image to each vertex of the reduced polygonal mesh comprises computing a barycentric weight of each pixel for each vertex of the reduced polygonal mesh.

9. A non-transitory computer-readable storage medium including instructions stored thereon which, when executed by at least one processor, cause the at least one processor to:
obtain a three-dimensional rendered image and a camera position;
obtain a triangle mesh representing the three-dimensional rendered image;
create a reduced triangle mesh by removing one or more triangles from the triangle mesh, wherein the one or more triangles are removed based on the camera position;
subdivide each triangle of the reduced triangle mesh into one or more subdivided triangles wherein the one or more subdivided triangles include a number of smaller triangles formed by a number of sub-edges and connecting edges divided from each triangle of the reduced triangle mesh, wherein the number of sub-edges divided from an edge of a triangle is defined by a proportion to a length of the edge;
perform a mapping of each pixel of the three-dimensional rendered image to the reduced triangle mesh;
assign a color value to each vertex of the reduced triangle mesh;
sort each triangle of the reduced triangle mesh using a depth value of each triangle; and
generate a two-dimensional triangle mesh using the sorted triangles of the reduced triangle mesh.

10. The non-transitory computer-readable storage medium of claim 9, wherein the instructions for creating a reduced triangle mesh by removing one or more triangles from the triangle mesh comprises:
determining that the one or more triangles are not visible to the camera using the camera position and the three-dimensional rendered image; and
removing the one or more triangles from the triangle mesh.

11. The non-transitory computer-readable storage medium of claim 9, wherein the connecting edge is a second sub-edge of an adjacent smaller triangle.

12. The non-transitory computer-readable storage medium of claim 9, wherein the instructions for assigning a color value to each vertex of the reduced triangle mesh comprises:
performing an inverse projection of the color value of a pixel of the three-dimensional rendered image to each vertex of the reduced triangle mesh;
detecting a triangle of the reduced triangle mesh that does not have an assigned color value;
identifying a nearest neighbor to the one or more triangle; and
assigning the color value of the nearest neighbor triangle to the triangle.

13. The non-transitory computer-readable storage medium of claim 12, wherein performing an inverse projection of the color value of a pixel of the three-dimensional rendered image to each vertex of the reduced triangle mesh comprises computing a barycentric weight of each pixel for each vertex of the reduced triangle mesh.

14. The non-transitory computer-readable storage medium of claim 9, wherein obtaining a three-dimensional rendered image comprises performing a three-dimensional rendering on a two-dimensional vector graphic.

15. The non-transitory computer-readable storage medium of claim 9, the instructions further comprising the processor to flatten the two-dimensional triangle mesh by removing a depth value from the two-dimensional triangle mesh, wherein the flattening is performed in a primitive space.

16. A system comprising:
a processor; and
a memory including instructions which, when executed by the processor, cause the system to:
obtain a three-dimensional rendered image and a camera position;
obtain a triangle mesh representing the three-dimensional rendered image;
create a reduced triangle mesh by removing one or more triangles from the triangle mesh, wherein the one or more triangles are removed based on the camera position;
subdivide each triangle of the reduced triangle mesh into one or more subdivided triangles wherein the one or more subdivided triangles include a number of smaller triangles formed by a number of sub-edges and connecting edges divided from each triangle of the reduced triangle mesh, wherein the number of sub-edges divided from an edge of a triangle is defined by a proportion to a length of the edge;

perform a mapping of each pixel of the three-dimensional rendered image to the reduced triangle mesh;

assign a color value to each vertex of the reduced triangle mesh;

sort each triangle of the reduced triangle mesh using a depth value of each triangle; and generate a two-dimensional triangle mesh using the sorted triangles of the reduced triangle mesh.

17. The system of claim 16, wherein the instructions which, when executed by the processor, cause the system to create a reduced triangle mesh by removing one or more triangles from the triangle mesh, further causes the processor to:

determine that the one or more triangles are not visible to the camera using the camera position and the three-dimensional rendered image; and remove the one or more triangles from the triangle mesh.

18. The system of claim 16, wherein the connecting edge is a second sub-edge of an adjacent smaller triangle.

19. The system of claim 16, wherein the instructions which, when executed by the processor, cause the system to assign a color value to each vertex of the reduced triangle mesh, further cause the processor to:

perform an inverse projection of the color value of a pixel of the three-dimensional rendered image to each vertex of the reduced triangle mesh;

detect a triangle of the reduced triangle mesh that does not have an assigned color value;

identify a nearest neighbor to the one or more triangle; and assign the color value of the nearest neighbor triangle to the triangle.

20. The system of claim 16, wherein the instructions which, when executed by the processor, cause the system to perform an inverse projection of the color value of a pixel of the three-dimensional rendered image to each vertex of the reduced triangle mesh, further cause the processor to compute a barycentric weight of each pixel for each vertex of the reduced triangle mesh.

* * * * *